3/24/87 XR 4,653,118

United States Patent [19]

de Jong

[11] Patent Number: 4,653,118

[45] Date of Patent: Mar. 24, 1987

[54] PRINTED CIRCUIT TRANSITION FOR COUPLING A WAVEGUIDE FILTER TO A HIGH FREQUENCY MICROSTRIP CIRCUIT

[75] Inventor: Roelof P. de Jong, Eindhoven, Netherlands

[73] Assignee: U.S. Philips Corporation, New York, N.Y.

[21] Appl. No.: 721,120

[22] Filed: Apr. 8, 1985

[30] Foreign Application Priority Data

Apr. 26, 1984 [NL] Netherlands ........................ 8401335

[51] Int. Cl.[4] .......................... H04B 1/18; H01P 1/17

[52] U.S. Cl. .................................... 455/286; 343/756; 333/21 A; 333/212

[58] Field of Search ............... 455/286, 325, 327, 328; 343/756, 772, 850, 860; 333/21 R, 21 A, 208, 209, 212

[56] References Cited

U.S. PATENT DOCUMENTS

| | | | |
|---|---|---|---|
| 3,623,112 | 11/1971 | Rupp | 343/772 |
| 4,011,566 | 3/1977 | Honda | 333/21 R |
| 4,178,574 | 12/1979 | Edens et al. | 343/756 |
| 4,280,113 | 7/1981 | Sekiguchi | 333/212 |
| 4,320,367 | 3/1982 | Boujet | 333/212 |
| 4,498,061 | 2/1985 | Morz et al. | 343/756 |
| 4,516,089 | 5/1985 | Goseianski et al. | 343/772 |

FOREIGN PATENT DOCUMENTS

| | | |
|---|---|---|
| 59927 | 2/1985 | European Pat. Off. . |
| 731498 | 6/1955 | United Kingdom . |

OTHER PUBLICATIONS

"The Waveguide Assembly of a Satellite Communications Earth Station in the Decimeter Waveband" by Antonenko et al. 3/1975.

"A Circularly-Polarised Aerial for Satellite Reception" by Gandy, 1976.

*Primary Examiner*—Jin F. Ng

*Attorney, Agent, or Firm*—Thomas A. Briody; William J. Streeter; Leroy Eason

[57] ABSTRACT

The invention relates to a receiving arrangement 4-1 for SHF signals, comprising a rectangular waveguide filter 5 formed from resonators 10-1 to 10-4 arranged in cascade, a SHF signal arrangement 6 containing a microstrip circuit and a microstrip to waveguide filter transition connected to this circuit.

Generally, such a receiving arrangement is not suitable for use in radiators comprising a partly shown polarization converter 3 with two such receiving arrangements 4-1 each receiving one of two mutually orthogonally polarized signals. When the prior art receiving arrangements are used in these radiators, the channel separation is inadequate.

According to the invention, an adequate channel separation is obtained by providing the microstrip to waveguide filter transition in the waveguide filter and matching the filter 5 thereto. As a result thereof, the receiving arrangement 4-1 becomes more compact and has a very low reflection and, in addition, it is no longer necessary to adjust the transition to the waveguide filter 5.

Preferably, dimensioning is realized by the choice of the size in the axial direction of the end resonator 10-4 and/or the choice of the dimensions of the coupling aperture which connects the end resonator 10-4 to the adjacent resonator 10-3.

5 Claims, 4 Drawing Figures

PRINTED CIRCUIT TRANSITION FOR COUPLING A WAVEGUIDE FILTER TO A HIGH FREQUENCY MICROSTRIP CIRCUIT

BACKGROUND OF THE INVENTION

1. Field of the Invention

The invention relates to a receiving arrangement for high-frequency signals, comprising a rectangular waveguide filter formed from resonators arranged in cascade and an SHF-signal arrangement which comprises a microstrip circit and a microstrip to waveguide transition constituted by a conductor pattern provided on a substrate and connected to the microstrip circuit.

2. Description of the Related Art

Such an arrangement is disclosed in issued Netherlands patent application 7700230 corresponding to U.S. Pat. No. 4,178,574, issued Dec. 11, 1979. In combination with a polarization converter, the receiving arrangement known from said patent application constitutes a radiator which in combination with a reflector forms an aerial arrangement. This aerial arrangement is used to receive high frequency (SHF)-signals, for example TV signals, having a carrier frequency of 12 GHz, which are transmitted by inter alia satellites. This prior-art receiving arrangement has a rectangular waveguide configuration provided with a horn at one end. At the end thereof there is a transparent window arranged at the focal point of the reflector and being preceded by a polarization converter for filtering out a channel characterized by a given polarization. At the other end the waveguide configuration has a microstrip to waveguide transition which is in the form of a microstrip to circular waveguide transition and is arranged between a microstrip circuit and the waveguide configuration.

Such a receiving arrangement can also be used in combination with further types of polarization converters, more specifically in a radiator in which two such receiving arrangements cooperate with one polarization converter. The polarization converter converts a left-handed circularly polarized wave into a first linearly polarized wave, which is applied to one of the receiving arrangements, whilst the polarization converter converts a right-handed circularly polarized wave into a linearly polarized wave which is orthogonal to the first wave and is applied to the other receiving arrangement. However, it has been found that when the prior art receiving arrangement is used in combination with such polarization converters the channel separation is not adequate for practical usage.

SUMMARY OF THE INVENTION

It is an object of the invention to extend the use of receiving arrangements for SHF-signals by rendering the receiving arrangement suitable for cooperation with other types of polarization converters and to realize such a receiving arrangement with low losses in a simple, cheap, accurately reproducible, and more compact way.

According to the invention, the receiving arrangement defined in the opening paragraph is characterized in that the microstrip to waveguide transition is in the form of a microstrip to waveguide filter transition, arranged in an end resonator of the waveguide filter and connected via an aperture in the waveguide filter end face bounding said end resonator to a portion of the SHF-signal arrangement located externally of the waveguide filter, and in that the microstrip to waveguide transition and the relevant end resonator are matched by dimensioning at least one of these two components.

The invention provides a receiving arrangement which because of its low reflection is inter alia rendered suitable for use in a radiator in which two receiving arrangements cooperate with one polarization converter. This improves the channel separation of such a radiator. Even in radiators in which only a single receiving arrangement cooperates with a polarization converter, these measures result in low reflection and improved transmission. A further advantage is that on mounting the microstrip to waveguide transition in the waveguide filter matching is not required as in addition to the fact that the properties of the microstrip to waveguide filter transition are already included in the design, theses properties are furthermore accurately reproducible in a manner suitable for mass production. In addition, a more compact structure of a receiving arrangement can be realized since a separate microstrip to waveguide transition together with a separate transition from the waveguide to the filter is avoided. It should further be noted that from European patent application No. 0059927 a receiving arrangement for high-frequency signals is known per se, which comprises a microstrip to waveguide filter transition provided in one of the end resonators of the waveguide filter. This relates, however, to a filter in the form of a circular waveguide having a microstrip circuit provided perpendicularly to the axial direction, the microstrip to waveguide filter transition being realised by means of a plurality of coupling probes provided perpendicularly to the microstrip circuit and each having axial and radial projections for broadband matching. Such a construction is not only complicated, but can furthermore not be massproduced cheaply and with a sufficiently accurate reproducibility.

It should here be noted that from United Kingdom Patent Specification No. 731,498 it is known per se to match the impedance of an end resonator of a waveguide filter to the impedance of a waveguide by changing its length. However, the relevant patent specification does not relate to a receiving arrangement for HF signals nor does it comprise a microstrip circuit, but it only relates to a microwave filter in the form of a circular waveguide having two identical waveguides which are each in the form of a coaxial line, each connected to another end resonator of the microwave filter.

BRIEF DESCRIPTION OF THE DRAWINGS

Embodiments of the invention will now be described by way of example with reference to an embodiment shown in the Figures, corresponding components in the different Figures having been given the same reference numerals. Therein.

DESCRIPTION OF THE PREFERRED EMBODIMENTS

Figure 1:
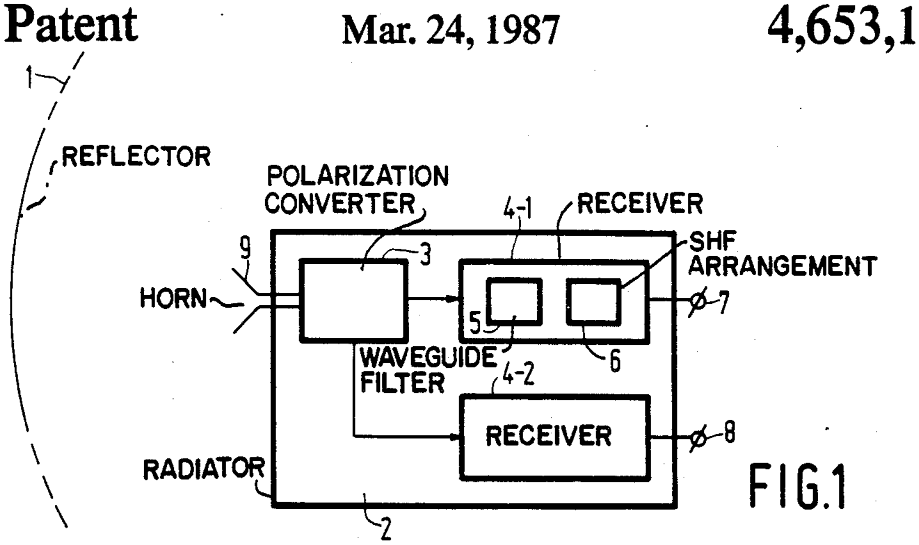
FIG. 1 is a diagrammatic representation of an aerial arrangement comprising two receiving arrangements embodying the invention.

FIG. 1 shows an aerial arrangement which comprises a reflector 1, which is shown partly, and a radiator 2 arranged at the focal point of the reflector 1. Aerial arrangements of this type are used to capture and further process circularly polarized SHF-signals transmitted by inter alia satellites. The blockdiagrammatically shown radiator 2 comprises a horn 9 and a polarization converter 3 connected thereto. Such a polarization converter is known from inter alia an article by C. Gandy, entitled "A circularly polarized aerial for satellite reception", Eng. Res. Rep. BBC-RD-1976/21, August '76. The polarization converter 3 is arranged to convert in known manner signals received in the form of circularly polarized waves into two mutually orthogonal, linearly polarized waves. One of these waves is applied to a first receiving arrangement 4-1 and the other wave to a second receiving arrangement 4-2 which is identical to the first. The receiving arrangements 4-1 and 4-2 each comprise a waveguide filter 5 and a SHF signal arrangement 6. The receiving arrangements 4-1 and 4-2 respectively are connected via their respective outputs 7 and 8 to equipment, not shown, for further processing of the received signals. The radiator may alternatively comprise a polarization converter as described in Netherlands patent application No. 7700230, in which circularly polarized waves are converted into only one type of linearly polarized waves. Such a radiator would comprise only one receiving arrangement 4-1. Receiving arrangements of this type will be described in greater detail with reference to FIGS. 2, 3 and 4.

Figure 2:
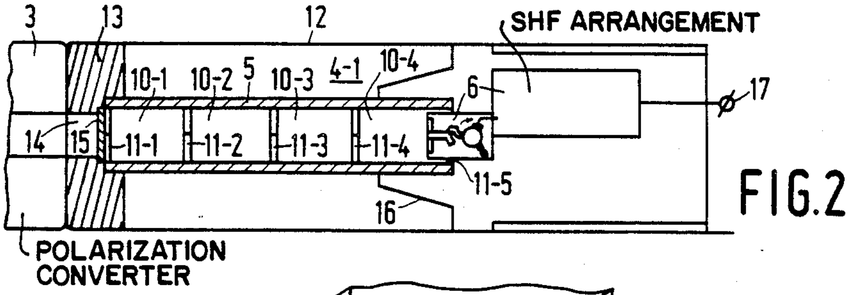
FIG. 2 is a cross-sectional view of a receiving arrangement embodying the invention.

FIG. 2 is a longitudinal cross-sectional view of a receiving arrangement 4-1, suitable for use in the aerial arrangement shown in FIG. 1. The receiving arrangement 4-1 comprises a cylindrical casing 12 in which a waveguide filter 5 and a SHF signal arrangement 6 are provided. The cylindrical casing 12 is hermetically closed at one end by means of a close-fitting waveguide flange 13 having an aperture 14. The front end of the rectangular waveguide filter 5 is located in the aperture 14, which aperture positions this end. The rear end of the waveguide filter 5, and also the SHF-signal arrangement 6 which is shown in two parts, are kept in their positions by a carrier 16 arranged in the cylindrical casing 12. At its front end the waveguide filter 5 is hermetically sealed by a window 15, made, for example, of glass or mica, which has for its object to prevent contaminants such as dust, gas and moisture from penetrating into the receiving arrangement 4-1. The rear end of the cylindrical casing 12 is hermetically sealed in a manner not shown further. By means of the waveguide flange 13 the waveguide filter 5 is connected to a partly shown polarization converter 3. In this embodiment, the waveguide filter 5 comprises five pairs of partitions 11-1 to 11-5, which divide the filter into four resonators 10-1 to 10-4. The shapes of the partitions 11-1 to 11-4 realize inductive reactances, which partly determine the filter function of the waveguide filter 5. The partition 11-1 is located at the front end of the waveguide filter 5 immediately behind said window 15. The partition 11-5 is provided in the end face at the rear end of the waveguide filter 5. One portion of the SHF-signal arrangement 6 is arranged in the end resonator 10-4 and is connected to another portion of this SHF-signal arrangement 6 located externally of the waveguide filter 5.

Figure 3:
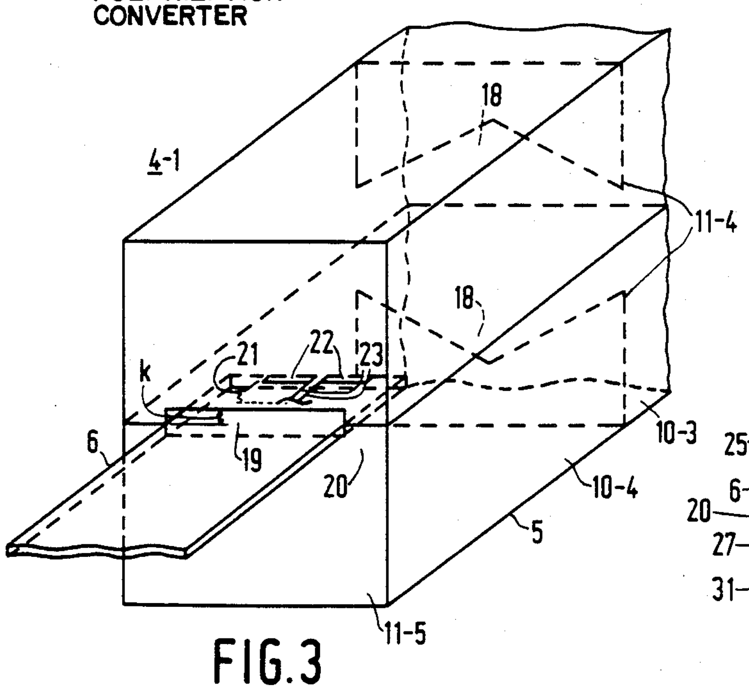
FIG. 3 is an elevational and partly cross-sectional view of a receiver arrangement embodying the invention.

FIG. 3 shows by means of an elevational and detailed view how this has been realized. This Figure shows that the waveguide filter 5 is assembled from two halves. The plane of separation between the two halves is constituted by the longitudinal symmetry plane bisecting the broad walls of the rectangular filter. Each partition of the four pairs of partitions 11-1 to 11-4 has a V-shaped notch 18. When the two halves of the waveguide filter are united, coupling apertures are formed between the partitions of corresponding pairs, as is shown for the pair of partitions 11-4. The coupling apertures in the partitions 11-1 to 11-3 are realized similarly. The resonators 10-1 to 10-4 are connected by means of the coupling apertures and arranged in cascade by the pairs of partitions 11-2 to 11-4. The V-shape of the notches provide inter alia the possibility to produce the two halves in a simple way and with a high degree of accuracy by means of impact extrusion, as described in Applicants' non-prepublished Netherlands patent application No. 8302439. In both halves of the partition 11-5 a recess is made which in the assembled state of both halves form an aperture 19 which in this embodiment has a rectangular cross-section. A portion of the SHF signal arrangement 6 is inserted into the end resonator through this aperture 19, the remainder extending from the waveguide filter 5. The short side of the aperture 19 may be denoted as its height. A portion, denoted by k in FIG. 3, of this height of the aperture 19 should have a given minimum size, which is dictated by the requirement that the E.M. field of the SHF-arrangement 6 must be disturbed as little as possible by the conducting endface. On the other hand, the maximum size of the height indicated by k is determined by the fact that it is undesirable for the waveguide filter 5 to radiate through the aperture 19. The structure of the SHF arrangement 6 is shown in greater detail in FIG. 4. This arrangement has a common substrate 20 which is provided on a first major surface, in this case the rear surface, with a conducting layer which covers part of this surface and is indicated by the hatched portion in FIG. 4, and forms a ground plane. A first conductor pattern 26 to 31 is provided on the opposite, second major surface, in this case the front surface. Together with the conducting layer on the rear surface and the substrate 20 therebetween, this conductor pattern constitutes a portion of a microstrip circuit 24 of the SHF-signal arrangement 6. For the remaining portion shown, the substrate 20 is provided only on its front surface with a balanced second conductor pattern comprising an aerial 22, and the pair of narrow conductors 23 operating as antenna feed line which forms a microstrip to waveguide filter transition 21. Of the SHF-signal arrangement 6, at least the transition 21 is fully contained within the resonator 10-4 of the waveguide filter 5, and the unbalanced microstrip circuit 24 is located externally thereof.

Figure 4:
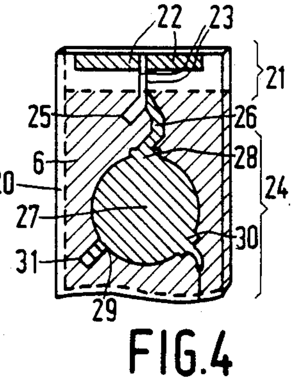
FIG. 4 is a front view of a portion of a SHF-signal arrangement for use in a receiving arrangement embodying the invention.

A balanced to unbalanced transformer 25, produced in microstrip technique, depicted by a line in FIG. 4, connects the balanced conductor pattern which is connected to one side of the transformer 25 to the unbalanced portion of the microstrip circuit 24. In this example the transformer 25 is provided on the substrate 20 and is in the form of a $\lambda/2$ transmission line. A microstrip conductor 26 is connected to that side of the transformer 25 which is connected to the microstrip circuit 24. The microstrip conductor 26 is connected to a Y-circulator 27 which is in the form of a directional isolator. To that end the substrate 20 is made of ferrite. Only the central conductor part of the Y-circulator is shown. The central conductor has three connecting ports 28, 29 and 30; the direction of circulation is from port 28 to 30 and from port 30 to 29, etc. The microstrip conductor 26 is connected to port 28 of the circulator 27, as a result of which signals coming from the waveguide filter 4 are conveyed via the transition 21 to a further portion of the SHF-arrangement 6 connected to port 30. Signals received from the further portion of the SHF-signal arrangement 6 are fully dissipated in a terminating impedance 31, which is made of resistance material.

The waveguide filter 5, with the resonators 10-1 to 10-4, the partitions 11-1 to 11-5 and the coupling apertures formed by the corresponding pairs of partitions is in this embodiment designed as a bandpass filter having a pass frequency range from 11.7 to 12.5 GHz, with a ripple less than 0.1 dB. To realize this bandpass filter, use can be made of basic techniques such as those described in the book "Microwave Filters, Impedance-matching Networks, and Coupling Structures", G. Matthaei, L. Young and E. M. T. Jones, published by Artech House Inc., 1980.

To ensure adequate operation of the receiving arrangement, the impedance characteristics of the aerial 22 and of the waveguide filter 5 must be matched over at least the desired pass frequency range. As is known from the above-mentioned book, the resonators of a filter must have among others a given reactance slope or subsceptance slope as a function of a frequency. In this embodiment this is accomplished by the choice of the dimensions of the four pairs of reactive partitions 11-1 to 11-4 and by proper dimensioning of the aerial 22. In the filter theory known from said book, this aerial performs the function of a reactive element which is in the form of an impedance transformer and is arranged at one end of the filter. Realizing this reactive element by an aerial entails that the real portion of the impedance of the aerial must have a certain constant value over at least the passband of the filter. At the same time, the aerial must have a linear reactance behaviour as a function of frequency at least over the passband. The reactive behaviour of the aerial affects both the reactance slope and the resonant frequency of the resonator coupled to the aerial. By appropriately dimensioning the resonator 10-4 and the reactive element 11-4, this influence can be compensated for. In this embodiment, an aerial 22 in the form of a dipole is chosen which, in the pass frequency range can be represented by a series arrangement of a reactance and a resistor which varies linearly with frequency. The measured resistance value of the aerial 22 with the pair of various conductors 23 coupled thereto and that portion of the SHF-signal arrangement 6 which is connected to this pair of conductors 23 has been chosen to be equal to the real terminating impedance of the resonator 10-4, which has the advantage that the use of an impedance transformer in the filter is avoided. Because of the fact that the microstrip to waveguide filter transition 21 is arranged in the end resonator 10-4, the reactance of the aerial 22 influences both the resonant frequency and the reactance slope of the end resonator 10-4. Because of appropriately dimensioning, the influence of the reactance of the aerial 22 is such that the resonant frequency and the reactance slope obtain their original values again. This dimensioning can more specifically be realized by the choice of the size in the axial direction of the end resonator 10-4, as the reactance of the end resonator can be changed therewith. As the coupling apertures formed by the pair of partitions 11-4 represent inductances, it is alternatively possible to effect matching by dimensioning at least these coupling apertures. It will be obvious that combinations of the afore-mentioned dimensioning methods can also be applied. Consequently, no adjustment is required on mounting the SHF-signal arrangement 6 in the waveguide filter 5. This is more specifically of importance when the receiving arrangement 4-1 is mass-produced. Because of the good match of the microstrip to waveguide filter transition 21 to the waveguide filter 5, the receiving arrangement 4-1 has a very low coefficient of reflection, which is expressed in a realized VSWR of 1.35 against a theoretically optimum value of 1.2 with a filter having −10 dB points at 11.5 and 12.85 GHz and having the above-mentioned passband between the −3 dB points. Consequently, the receiving arrangement 4-1 is very suitable for use in radiators in which two receiving arrangements cooperate with a polarization converter.

Fitting the waveguide filter transition 21 directly in the waveguide filter 5 accomplishes in addition, a compact structure for the receiving arrangement 4-1, In general, the construction of the radiator 2 is not limited to the use of a receiving arrangement 4-1 with the aerial 22 shown, but all aerials having a linear reactance behaviour and a constant real portion can be used.

In this embodiment the resonators 10-1 to 10-4 are of the series-resonant type. The same principle can be used when the filter is assembled from parallel-resonant resonators.

What we claim is:

1. In a receiving arrangement for high-frequency (SHF) signals, such arrangement comprising: a rectangular waveguide filter formed from a series of coaxial resonators arranged in cascade from the initial resonator to the end resonator, such end resonator having an end face; an SHF-signal arrangement comprising a microstrip circuit; and a transition connecting such microstrip circuit to said end resonator, said transition being constituted by a conductor pattern on a substrate; the improvement characterized in that said transition is located in said end resonator and is coupled to said SHF signal arrangement by an aperture in the end face of said end resonator; the physical dimensions of said transition relative to the physical dimensions of said end resonator being such that the impedance of said transition matches the terminating impedance of said end resonator.

2. An improved receiving arrangement as claimed in claim 1, further characterized in that said transition comprises an aerial having a complex impedance whose real portion is equal to the real portion of the terminating impedance of said end resonator, and the axial length of said end resonator is such that the imaginary portion of the terminating impedance thereof matches the imaginary portion of the impedance of said aerial.

3. An improved receiving arrangement as claimed in claim 1, further characterized in that said transition comprises an aerial having a complex impedance, the dimensions of the coupling aperture in the end face of said end resonator being such that the imaginary portion of the terminating impedance of said end resonator matches the imaginary portion of the impedance of said aerial, whereby said end resonator is coupled to the adjacent resonator of said waveguide filter.

4. An improved receiving arrangement as claimed in claim 2 or 3, further characterized in that said microstrip circuit of said SHF-signal arrangement comprises a substrate having first and second major surfaces opposite each other, a conducting layer being provided on said first major surface, a first conductor pattern being provided on a portion of said second major surface, and the remainder of said second major surface being provided with a second conductor pattern which constitutes the aerial comprised in said transition.

5. An improved receiving arrangement as claimed in claim 1, said waveguide filter being symmetrical about a longitudinal plane of symmetry, said aperture being in the form of a slot of rectangular cross-section arranged so that such slot is lengthwise intercepted by said longitudinal plane of symmetry of said filter.

* * * * *